UNITED STATES PATENT OFFICE.

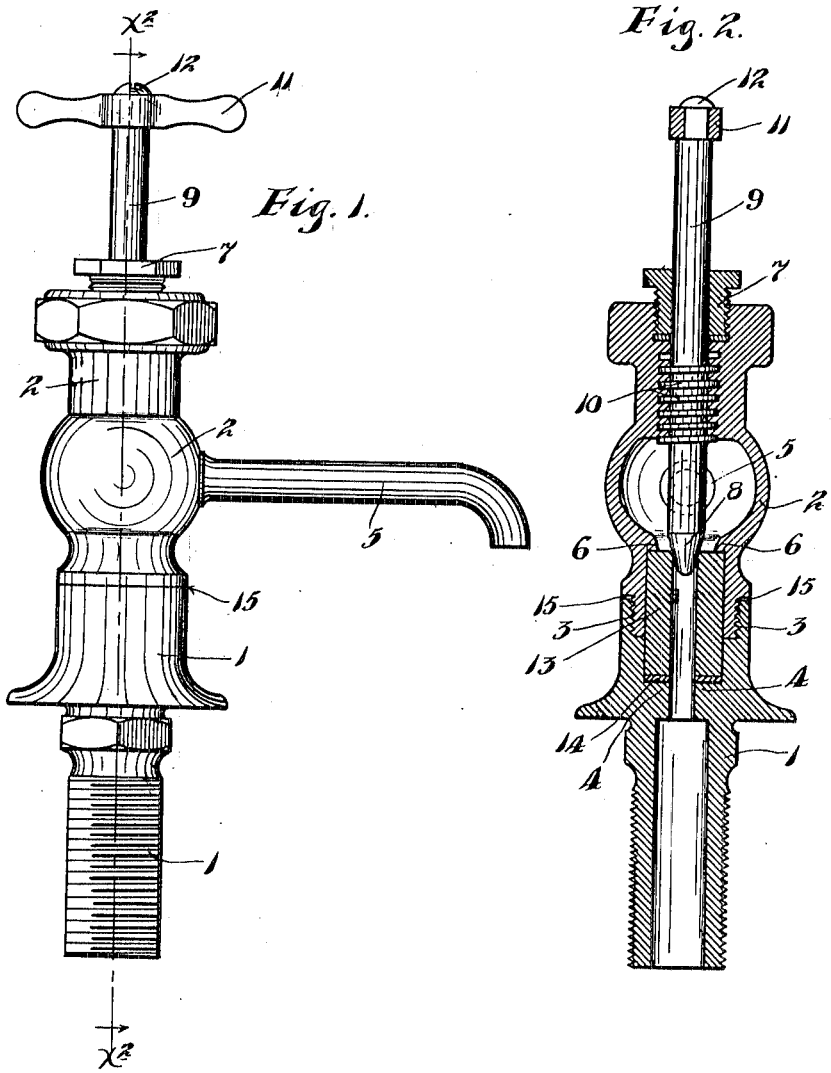

JOHN T. MORRISON, OF MINNEAPOLIS, MINNESOTA.

VALVE MECHANISM.

1,099,389.

Specification of Letters Patent.

Patented June 9, 1914.

Application filed April 17, 1912. Serial No. 691,498.

*To all whom it may concern:*

Be it known that I, JOHN T. MORRISON, a citizen of the United States, residing at Minneapolis, in the county of Hennepin and State of Minnesota, have invented certain new and useful Improvements in Valve Mechanism; and I do hereby declare the following to be a full, clear, and exact description of the invention, such as will enable others skilled in the art to which it appertains to make and use the same.

My invention has for its particular object the provision of an improved valve seat for various different kinds of valve mechanisms, such, for instance, as faucets, bibs, ball cocks or tank valves, globe valves and the like, and to such ends, generally stated, the invention consists of the novel construction and arrangement of parts hereinafter described and defined in the claim.

In the accompanying drawings I have shown my invention incorporated in a faucet or bib of the type generally employed in connection with lavatory basins and bath tubs.

In the said drawings, like characters indicate like parts throughout the several views.

Referring to the drawings, Figure 1 is a side elevation of the improved faucet; and Fig. 2 is a vertical section taken on the line $x^2$ $x^2$ on Fig. 1.

The numerals 1 and 2 indicate, respectively, the base and head sections of the faucet, which parts are connected in the usual way by a telescopically threaded joint 3. Both of the said sections 1 and 2 are tubular and from a broad point of view, constitute or make what may be treated as a valve casing. The section 1 has an internal annular clamping shoulder 4 and the section 2 has an enlarged intermediate portion, from one side of which a nozzle pipe 5 is extended. At the lower portion of its enlarged intermediate portion, the said head section 2 is formed with an internal annular clamping shoulder 6. The upper end of the head section 2 is made solid or integral with the body thereof and is provided with a tubular threaded stuffing box 7. The valve proper is formed by a conical lower end 8 of a valve stem 9 that extends through the stuffing box 7 and through the upper end of the head section 2, and has threaded engagement at 10, with the latter. A hand piece 11 is detachably secured to the upper end of the stem 9, preferably, in the customary way by means of a screw 12. It may be here noted that with this construction, the upper end of the head section 2 may be cast integral with the body thereof, thereby effecting economy in construction, and when the hand piece 11 is detached from the valve stem 9 and the head piece detached from the base 1, the said valve stem may be screwed inwardly and removed through the open lower end of the said section 2. This is a novel and important feature which, however, in many applications of my improved valve seat, presently to be described, will not be employed.

In accordance with the principal feature of this invention, I employ a tubular valve seat 13 which is seated partly in each of the sections 1 and 2 and is clamped against and between the shoulders 4 and 6 of the said members 1 and 2. This tubular valve 13 is constructed of metal that is non-corrodible in water and which is pliable or relatively soft as compared with the coöperating valve. For instance, the valve 9 will be made of brass, and the tubular valve seat 13 of Babbitt, lead, copper or any other well known relatively soft or pliable and non-corrodible composition of materials. This tubular valve 13 is also reversible end for end. The tapered or conical valve 8 will, therefore, seat itself always with a tight joint in the upper end of the valve seat, and the force applied to the valve seat will tend to expand the same and more tightly seat the same in the head section 2 of the faucet. When the shoulders 4 and 6 of the faucet sections 1 and 2 are tightly screwed against the ends of the said relatively soft or pliable metal valve seat 13, its tight joints will be formed so that there will be no leakage of water around the exterior of the said valve seat. In some instances, a pliable washer of leather, rubber or similar material indicated at 14 is interposed directly between the annular shoulder 4 and the lower end of the reversible tubular valve seat 13. When the tubular valve seat 13 is made of very pliable or soft metal, the washer 14 may be dispensed with, but it is desirable because it gives an adjustability which permits the sections 1 and 2 to be brought together until there is a closed joint at the point marked 15 on Fig. 2. The so-called pliable tubular valve seat is not elastic like rubber or composition including rubber, and elasticity is not a desirable feature. The pliability is desirable because it permits of a self-seating action between the valve and seat which will always be maintained by wear, and furthermore, it permits the use of tubular valve seat of such diameter that it may be easily inserted into the seat provided therefor in the members of the faucet or other valve casing, and this valve seat, under the expanding pressure of the valve, will be thereafter expanded for a close engagement with the surrounding casing, thereby further insuring a water-tight joint. The clamping action on the ends of the tubular valve seat produced by the shoulders 4 and 6 is, however, primarily relied upon to form water tight joints, and this latter action is insured when the tubular valve seat is of a metal that is pliable or relatively soft, also as compared with the metal employed in the sections 1 and 2 and, consequently, in the shoulders 4 and 6. The said sections 1 and 2 specifically are, as stated, the base and head sections of the faucet, but from a broad point of view, they are separable sections of a valve casing which may take a great many different forms in different kinds of valve mechanisms. The so-called tubular valve seat may be made in any desired number of sections of any desired length. Inasmuch as this valve seat is relatively a pliable member, it will, of course, be worn away much faster than the valve, but when too greatly worn at one end, it may be reversed end for end, and the length of its life thereby doubled.

By reference to Fig. 2, it will be noted, that when the two sections of the valve casing are separated and the valve is screwed downward or against the valve seat 13, the latter will be forced endwise out of the section 2 to which the said valve is applied.

What I claim is:

The combination with a valve casing made up of separable sections and provided with opposing internal shoulders and having a uniting joint located between said shoulders, of a tubular valve seat loosely telescoped into said casing and made entirely of ductile or non-elastic metal and having tight joints between its ends and the internal shoulders of said casing, and a valve working through one of the sections of said casing with endwise and rotary movement, and having a conical end adapted to engage the adjacent end of said tubular seat, and under its seating movement serving to maintain a tight joint with said valve seat, the said valve being of a much harder metal than the valve seat.

In testimony whereof I affix my signature in presence of two witnesses.

JOHN T. MORRISON.

Witnesses:
HARRY D. KILGORE,
MILDRED L. MUMMS.